Aug. 9, 1932.  A. D. GARDNER  1,870,993
AUTOMOTIVE FAN BEARING
Filed July 8, 1930
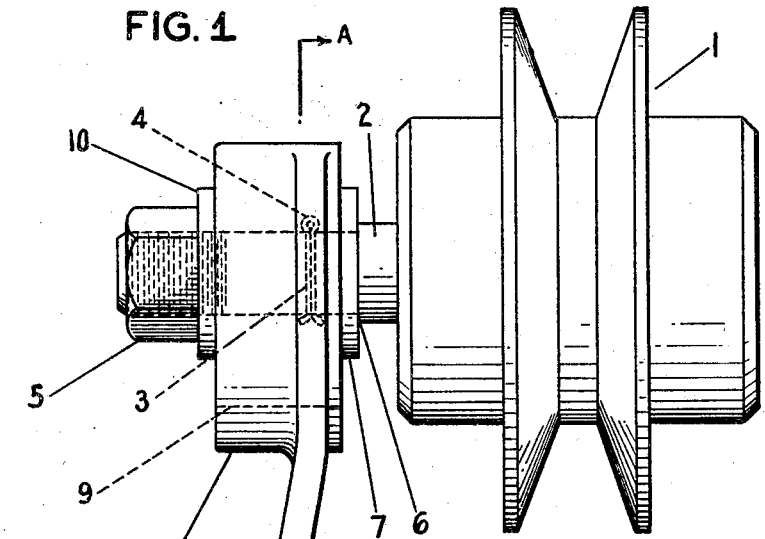
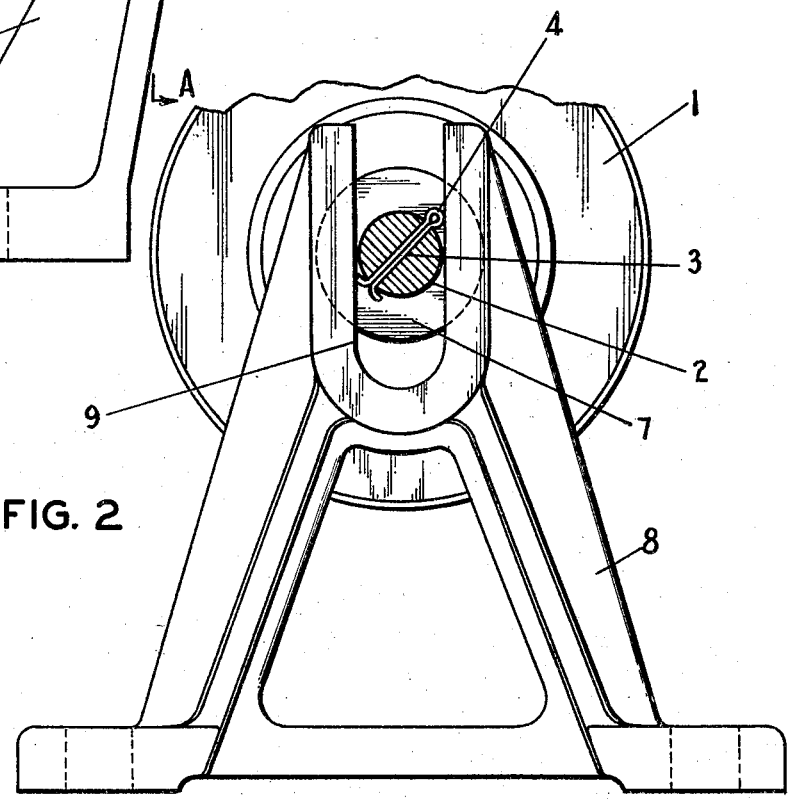
INVENTOR
Archibald D. Gardner
BY
ATTORNEY Patented Aug. 9, 1932

1,870,993

UNITED STATES PATENT OFFICE

ARCHIBALD D. GARDNER, OF JACKSON, MICHIGAN, ASSIGNOR TO AUTOMOTIVE FAN & BEARING CO., A CORPORATION OF MICHIGAN

AUTOMOTIVE FAN BEARING

Application filed July 8, 1930. Serial No. 466,486.

This invention relates to fans for use on automobiles.

One object of the invention is to construct automobile fans at moderate cost with the stub shaft and supporting bracket arranged so that minimum labor will be required to attach and remove the fan from the automobile.

Other objects of the invention will appear in the following description, reference being had to the drawing, in which:

Fig. 1 is an elevation of the fan assembly and its supporting bracket, fan blades not being illustrated.

Fig. 2 is an end view of the supporting bracket shown in Fig. 1, the stub shaft being sectioned on line A—A of Fig. 1.

Referring to the drawing, a fan pulley 1 is rotatably arranged on the stub shaft 2. The stub shaft 2 is drilled at 3 (Fig. 2) to receive a cross pin or split key 4 and the inner end of this shaft is threaded to receive a nut 5. The stub shaft preferably is shouldered at 6 to abut against washer 7.

The supporting bracket 8 (Fig. 2) has an elongated slot 9 to permit the stub shaft 1 being located in various positions to provide for the tightening of the pulley belt by lowering or raising the stub shaft and the fan assembly. This bracket may be made of various forms but the shape shown in Fig. 2 is a desirable construction.

To attach the fan assembly to the bracket the inner end of the shaft is slid into slot 9 in the bracket with the washers 7 and 10 at each side thereof. The fan assembly is located at such position in the slot as to provide the desired tension of the belt and the nut 5 is then tightened to hold this position by clamping the washers against the side of the bracket. Since the fan assembly covers substantially all of the stub shaft and prevents use of a wrench I have provided the split key 4 to hold the shaft from turning without in any way preventing it from being raised or lowered to tension the belt. This permits the clamping of the fan in position without rotation of the stub shaft as the nut 5 is turned. The arrangement of the cross member 4 in this position does not in any way hamper the insertion of the stub shaft in the slot 9 nor the adjustment thereof and it has proved to be a very practical and convenient means for preventing the rotation of the shaft.

Various modifications may be made without departing from the spirit of my invention.

Having described my invention, what I claim is:

1. In automobile fans, a shaft, a bracket having a slot adapted to receive one end of said shaft, said slot being of greater length than the diameter of the shaft, a shoulder on the shaft, a nut on the shaft adapted to clamp the bracket against said shoulder and a pin extending through the shaft and secured therein within the said slot, to hold the shaft from rotation while said nut is being tightened, but permitting the longitudinal adjustment of the shaft before the tightening thereof.

2. In automobile fans, a shaft, a bracket having a slot adapted to receive one end of said shaft, said slot being of greater length than the diameter of the shaft, a shoulder on the shaft, a nut on the shaft and adapted to clamp the bracket against the shoulder and a split key extending through the shaft within the said slot and having its free ends spread apart whereby the said key prevents the shaft from rotating while the nut is being tightened but permits longitudinal adjustment in the slot before the tightening thereof.

In testimony whereof, I have signed my name to this specification this 3rd day of July, 1930.

ARCHIBALD D. GARDNER.